(No Model.)
M. ARNDT.
ELECTRIC APPARATUS FOR REGISTERING FIGURES AT DISTANCES.
No. 569,598. Patented Oct. 20, 1896.
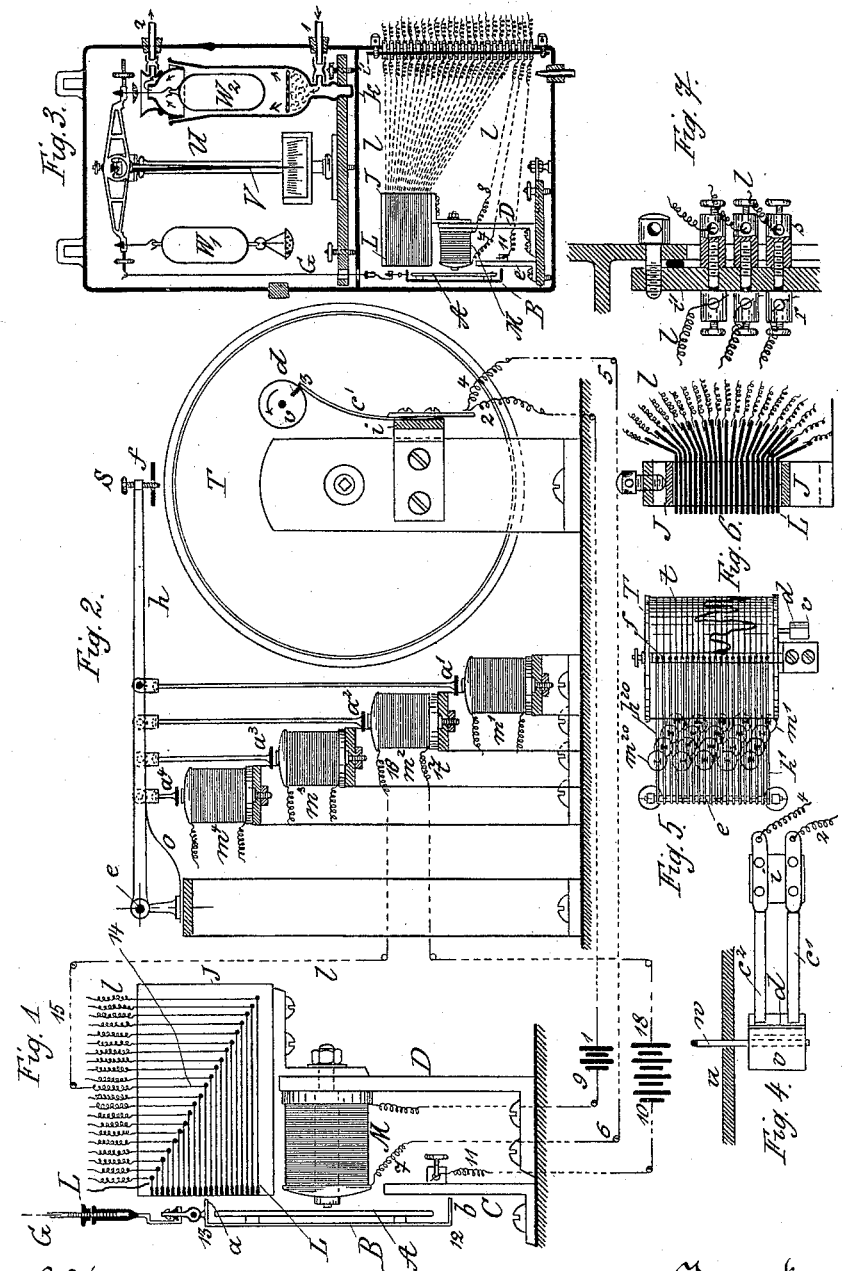

UNITED STATES PATENT OFFICE.

MAX ARNDT, OF AIX-LA-CHAPELLE, GERMANY.

ELECTRIC APPARATUS FOR REGISTERING FIGURES AT DISTANCES.

SPECIFICATION forming part of Letters Patent No. 569,598, dated October 20, 1896.

Application filed August 5, 1895. Serial No. 558,316. (No model.)

*To all whom it may concern:*

Be it known that I, MAX ARNDT, a subject of the German Emperor, and a resident of Aix-la-Chapelle, in the Kingdom of Prussia, Germany, have invented certain new and useful Electric Apparatus for the Registration of Figures in the Distance on Dials of Scales for Weighing or Measuring and on Movable Objects, &c.; and I do hereby declare that the following is a full, clear, and exact description of the invention, which will enable others skilled in the art to which it appertains to make and use the same.

This invention relates to means for recording from a distance the oscillations of weighing-balances or measuring instruments.

The invention has for its object to record the movements of a pointer oscillating in front of an indicating-scale or of a weighing or measuring instrument—for example, a gas-balance, or a draft or current meter, or a pyrometer—at any distance from the weighing or measuring instrument.

The invention consists in a mechanism by means of which an oscillating body, in connection with a moving part of a balance or measuring instrument, operates by its oscillations the contact between a battery and several conductors located one above another and each of which sets in operation an electromagnet placed at a distance, thereby causing a lever to be pressed against the paper sheet of a rotary recording-drum, so that each position of the oscillating body is indicated upon said drum by a separate lever.

In the drawings, Figure 1 is a side view of that part of the mechanism by which the contact between the battery and the several conductors is operated by means of the oscillating body; Fig. 2, a side view of that part by which the recording of the oscillations is effected; Fig. 3, a sectional view, on a diminished scale, of the complete mechanism with a gas-balance; Fig. 4, a plan view of an arrangement for breaking and closing from time to time the circuit for the electromagnet which attracts the oscillating body; Fig. 5, a plan view, on a diminished scale, of the recording apparatus. Fig. 6 shows a modified arrangement of the various conductors; Fig. 7, a detail sectional view of an arrangement for insulating the conducting-wires.

G, Figs. 1 and 2, is a suspended frame or rod in connection with any convenient part which follows or repeats the oscillations of the balance or measuring instrument. On the bottom end of said frame or rod is hung an oscillating body B, of any suitable form, provided with an armature A, which body and armature, except at the moment of the recording operation, is free to move up and down in front of an electromagnet M, mounted on a frame D. Underneath said electromagnet there is an electric conducting part C, and above the same, carried by an insulating-frame I, a number of insulated conductors L, of wire, but which may also be of a flat shape, as shown in Fig. 6. The number of the conductors L is the same as the number of divisions of the indicating-scale of the instrument or oscillations or positions indicated by the pointer of the instrument, and the distances apart of the several conductors L are proportionate to the scale-divisions of the balance or measuring instrument. Conducting-wires $l$, Figs. 1 and 2, severally branch off one from each conductor L to a separate electromagnet $m'$, or $m^2$, or $m^3$, &c., of the corresponding recording apparatus, which may be located at any desirable distance from the mechanism shown in Fig. 1, and which recording apparatus comprises the same number of electromagnets $m'$ $m^2$ $m^3$, &c., as there are conductors L, a like number of armatures $a'$ $a^2$ $a^3$, &c., a like number of recording-levers $h'$ $h^2$ $h^3$, &c., and a recording-drum driven by a clockwork mechanism T and carrying on its periphery $t$ a sheet of paper or a paper strip which is unwound therefrom. Said mechanism further comprises, in connection with the clockwork mechanism, any suitable electric contact device, which, for example, may consist of the spindle $w$, penetrating through the side $u$ of the clockwork-casing, the non-conducting hard india-rubber cylinder $v$, with the contact-bar $d$ fixed therein, and the two contact-springs $c'$ $c^2$, Figs. 2 and 4, fixed to the insulator $i$ and in connection with the conductors 2 4.

The recording-levers $h'$ $h^2$, &c., may be mounted in any suitable way, for example, to turn on a common spindle $e$. Each of these levers carries an armature $a'$ or $a^2$, &c., and a writing or pressure stud or style S. In order to prevent lateral yielding of the levers, the marking-studs S may be guided in a perforated rail $f$. Each of the armatures $a'$ is located at a small distance from its electromagnet $m'$ or $m^2$, &c. These magnets, suitably arranged one below another, are each separately in connection with the main battery through a conductor 17 18, and said battery further connected with the conducting part C, Fig. 1, through a conductor 10 11. The electromagnet M, Fig. 1, receives current from a second battery through conductors 1 2 3 4 5 6 7 8 9.

With a view to greater clearness only one of the conducting-wires $l$ is shown leading from the mechanism of Fig. 1 to that of Fig. 2.

In Fig. 3 the mechanism of Fig. 1 is shown, by way of example, in connection with a gas-balance supported on a column U and comprising the beam, the weighing-body $W'$, suspended in the air, and the weighing-body $W^2$, about which the gases to be weighed circulate in the direction of the arrows. The heavier the gases the higher will the body $W^2$ be driven upward and the pointer V moved from the left to the right in front of the scale. With the lighter gases the reverse will be the case. The oscillating body B, hung on the suspended frame or rod G, follows the oscillations of the balance.

The conducting-wires $l$ may be assembled in an insulating plate or frame $i'$, Figs. 3 and 7, attached to the side of the casing $k$. Said wires are entered in the conductors $r$ $s$, and from the latter branch off to the electromagnets $m'$ $m^2$ $m^3$, &c. Said wires may, between the mechanisms of Figs. 1 and 2, be united into one or more cables, and signaling devices may be interposed in those conducting-wires which serve for transmitting particularly-important positions of the pointer.

Upon the contact-bar $d$ in the hard india-rubber cylinder $v$, Fig. 2, coming against the two contact-springs $c'$ $c^2$ the magnet $m$ receives current, attracts the armature A, and therewith the oscillating body B, and this latter, by means of its ends $a$ and $b$, closes the circuit between the conductor C and one of the conductors L in the line 10 11 12 13 14 15 16 17 18. Thereupon one of the electromagnets $m'$ or $m^2$, &c., also receives current, attracts the corresponding armature $a'$ or $a^2$, &c., and thus sets the corresponding registering-lever in motion, so that the stud or style S of the latter marks upon the paper sheet or strip of the registering-drum the height of the part $a$ of the oscillating body B; therefore the position to which the pointer of the weighing or measuring instrument has oscillated.

Upon the withdrawal of the contact-bar $d$ from the contact-springs $c'$ $c^2$ the electric current is again broken and the recording-lever returned to the state of rest position by means of a spring $o$.

The non-conducting hard india-rubber cylinder $v$ may be fitted with several contact-bars $d$, and then the electric circuit would be closed more frequently.

What I claim as my invention, and desire to secure by Letters Patent, is—

A mechanism for recording the oscillations or strokes of a gas-balance at a distance from the instrument, consisting of an oscillating body in connection with a moving part of the instrument, which oscillating body is suspended in front of several conductors L arranged one above another and in front of a conductor C connected with the battery; and of a rotary recording-drum over or in front of which are arranged, fixed in levers, writing or marking studs or styles, each of said levers being placed behind or over an electromagnet and each of the series of electromagnets being on the one hand in connection with a conductor L and on the other hand with the battery, and of an electromagnet M in connection with a battery through conducting-wires in which is interposed a circuit-breaker which periodically breaks the electric circuit, said magnet M being located opposite the oscillating body, substantially as described and shown.

In testimony whereof I sign this specification in the presence of two subscribing witnesses.

MAX ARNDT.

Witnesses:
JOHN HECKMANNS,
W. C. EMMET.